United States Patent
Wu et al.

(10) Patent No.: US 12,159,430 B2
(45) Date of Patent: Dec. 3, 2024

(54) COMPUTER-IMPLEMENTED AUTOMATIC PRECISION CALCULATION METHOD OF IMAGING POSE OF ROTATIONAL LINEAR ARRAY SCANNING IMAGE

(71) Applicant: Wuhan University, Wuhan (CN)

(72) Inventors: Zhaocong Wu, Wuhan (CN); Zhao Yan, Wuhan (CN)

(73) Assignee: WUHAN UNIVERSITY, Wuhan (CN)

(*) Notice: Subject to any disclaimer, the term of this patent is extended or adjusted under 35 U.S.C. 154(b) by 338 days.

(21) Appl. No.: 17/897,203

(22) Filed: Aug. 28, 2022

(65) Prior Publication Data

US 2023/0186519 A1    Jun. 15, 2023

(30) Foreign Application Priority Data

Dec. 15, 2021  (CN) .......................... 202111528224.6

(51) Int. Cl.
    *G06T 7/80*  (2017.01)
    *G06T 7/579*  (2017.01)
(52) U.S. Cl.
    CPC .............. *G06T 7/80* (2017.01); *G06T 7/579* (2017.01); *G06T 2207/30244* (2013.01)
(58) Field of Classification Search
    CPC . G06T 7/80; G06T 7/579; G06T 2207/30244; G06T 2207/10016; G06T 7/73; G06T 17/00; G06T 2207/10008; G06T 3/073

USPC .......................................................... 382/103
See application file for complete search history.

(56) References Cited

U.S. PATENT DOCUMENTS

| | | | | |
|---|---|---|---|---|
| 2015/0154453 A1* | 6/2015 | Wilf | ........................ | G06T 7/564 382/103 |
| 2018/0137644 A1* | 5/2018 | Rad | ........................ | G06V 10/242 |
| 2021/0327136 A1* | 10/2021 | Steger | ........................ | G06T 3/40 |

* cited by examiner

*Primary Examiner* — Huy C Ho
(74) *Attorney, Agent, or Firm* — MATTHIAS SCHOLL P.C.; Matthias Scholl

(57) ABSTRACT

An automatic precision calculation method of a pose of a rotational linear array scanning image includes: obtaining a collection parameter of the rotational linear array scanning image and a camera intrinsic parameter; based on the above parameters, projecting the rotational linear array scanning image to its tangent plane by orthographic projection transformation to generate an equivalent frame image having the approximately same intrinsic and extrinsic parameters as the rotational linear array scanning image and calculate a coordinate of each pixel of the equivalent frame image projected onto the rotational linear array scanning image based on an inverse projection transformation calculation method; by using structure-from-motion method, automatically calculating a pose parameter of the equivalent frame image and a corresponding waypoint three-dimensional coordinate; with the pose parameter of the equivalent frame image as an initial value, obtaining an accurate imaging parameter of the rotational linear array scanning image.

8 Claims, 5 Drawing Sheets

COMPUTER-IMPLEMENTED AUTOMATIC PRECISION CALCULATION METHOD OF IMAGING POSE OF ROTATIONAL LINEAR ARRAY SCANNING IMAGE

CROSS-REFERENCE TO RELATED APPLICATIONS

Pursuant to 35 U.S.C. § 119 and the Paris Convention Treaty, this application claims foreign priority to Chinese Patent Application No. 202111528224.6 filed Dec. 15, 2021, the contents of which, comprising any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of image geometric processing and three-dimensional reconstruction, and more particularly to an automatic precision calculation method of a pose and an imaging model of a rotational linear array scanning image.

At present, hyperspectral imagers of linear array scanning imaging mode are a major imaging way of hyperspectral cameras due to good space-spectrum consistency, optimal space-spectrum resolution and good cooperation with various imaging platforms (unmanned aerial vehicle, manned aerial vehicle and satellite and the like). Such cameras can only obtain one scanning line image through one exposure. To obtain continuous scenario images, it is usually required to fix the camera on a rotational cradle head which drives the camera to perform uniform circular motion to collect spatial data of another dimension.

For a hyperspectral image collected by panorama linear array scanning, its imaging is inconsistent with an aperture imaging model and internal and external orientation elements of an image cannot be restored based on existing projective geometry theory. The current research is based on a basic hypothesis that a camera performs an approximate uniform circular motion to construct a rigorous imaging model of a rotational scanning linear array camera considering camera intrinsic parameter, camera set parameter and rotational cradle head motion parameter.

However, this model is complex in form and cannot be directly used to obtain an analytical solution of an inter-image relative positional relationship. It is required to use the optimal estimation method (e.g. Levenberg-Marquardt method) to perform iterative optimization so as to finally obtain a least square solution of all parameters. In this algorithm, the accuracy of an initial parameter value has great impact on the correctness of a result. A good initial parameter value can enable the algorithm to quickly converge so as to obtain an optimal solution whereas a poor initial value will cause the algorithm to converge slowly or converge to a local optimal solution or even be unable to converge.

SUMMARY

The disclosure provides a precision calculation method of a pose of a multi-view rotational linear array image based on an equivalent frame image. The method generates an equivalent frame image having the same intrinsic and extrinsic parameters as a raw rotational linear array scanning image and calculates a pose parameter of the equivalent frame image based on automatic structure-from-motion algorithm and finally uses the pose parameter as an initial value of iterative optimization solution so as to calculate an accurate imaging pose and a waypoint three-dimensional coordinate of the final linear array image.

According to an aspect of embodiments of the disclosure, there is provided an automatic precision calculation method of a pose of a rotational linear array scanning image, comprising: obtaining a collection parameter of the rotational linear array scanning image and a camera intrinsic parameter; based on the above parameters, projecting the rotational linear array scanning image to its tangent plane by orthographic projection transformation to generate an equivalent frame image having the approximately same intrinsic and extrinsic parameters as the rotational linear array scanning image and calculate a coordinate of each pixel of the equivalent frame image projected onto the rotational linear array scanning image based on an inverse projection transformation calculation method; by using structure-from-motion method, automatically calculating a pose parameter of the equivalent frame image and a corresponding waypoint three-dimensional coordinate; with the pose parameter of the equivalent frame image as an initial value, obtaining an accurate imaging parameter of the rotational linear array scanning image by an optimal estimation method.

According to an aspect of embodiments of the disclosure, there is provided an equivalent frame projection transformation model, which can project a rotational linear array scanning image to its tangent plane according to four parameters: camera pitch angle, included angle of adjacent scanning lines, camera focal length, and image principal point. Further, to generate an equivalent frame image, the following flow is used to perform inverse projection transformation calculation: firstly, calculating a line connecting a point on the tangent plane and a projection center as a first vector, and then based on the first vector, calculating a rotational angle of a scanning line where the point is located with respect to a central scanning line and further calculating a coordinate of the scanning line where an inverse projection point is located; then, calculating a direction of a principal optical axis of the scanning line where the point is located as a second vector; finally, calculating an included angle of the first vector and the second vector, i.e. an included angle of an image point and the principal optical axis, so as to calculate an ordinate of the inverse projection point.

According to another aspect of embodiments of the disclosure, based on the equivalent frame projection transformation model, the camera pitch angle can be calculated in combination with a projection curve of one straight line in a scenario on an image in the following specific flow: selecting a projection curve of one straight line unparallel to the scanning line in a scenario on the rotational scanning image; selecting three points on the project curve; based on an equivalent frame projection formula, projecting the three points onto the equivalent frame image and based on a constraint of three projection points on the equivalent frame image on a same straight line, solving the camera pitch angle.

The technical solution adopted by the disclosure is a computer-implemented automatic precision calculation method of an imaging pose of a rotational linear array scanning image, comprising the following steps:

at step S101, using a linear array camera provided on a rotational cradle head to collect one group of rotational linear array scanning images and recording a camera set parameter for the collection of these images and a camera intrinsic parameter;

at step S102, according to the camera intrinsic parameter and the image collection parameter of the step S101, projecting the rotational linear array scanning image to a tangent plane of the image by orthographic projection transformation to generate an equivalent frame image having the approximately same intrinsic and extrinsic parameters as the rotational linear array scanning image and calculate a coordinate of each pixel of the equivalent frame image projected onto the rotational linear array scanning image based on an inverse projection transformation calculation method;

at step S102, the tangent plane being tangent to an image plane of the rotational linear array scanning image at a central scanning line, and projecting the rotational linear array scanning image to the tangent plane of the image in the following implementation:

for a particular point $p_r$ on the rotational scanning imaging plane, a coordinate of image is $(x_r, y_r)$, a rotation angle of the scanning line where the image is located with respect to the central scanning line is $\omega$, an included angle between an incident ray of the point and a principal optical axis of the scanning line where the point is located is $\gamma$, and both are calculated as follows:

$$\omega = (x_r - p_x^r)\alpha_x$$
$$\gamma = \arctan \frac{y_r - p_y^r}{f}$$

wherein $p_x^r$ is an abscissa of the central scanning line, and $p_y^r$ is an ordinate of an image principal point of the rotational linear array scanning image;

based on projection relationship, a coordinate of an intersection point $p_f$ of the incident line of the point $p_r$ and the equivalent frame imaging plane under an equivalent frame image coordinate system is calculated in the following formula:

$$\begin{cases} x_f = \frac{\sin \omega}{\tan(\phi_c + \gamma)\sin \phi_c + \cos \omega \cos \phi_c} \cdot \frac{1}{\tan \alpha_x} + p_x^f \\ y_f = \frac{\tan(\phi_c + \gamma)\cos \phi_c - \cos \omega \sin \phi_c}{\tan(\phi_c + \gamma)\sin \phi_c + \cos \omega \cos \phi_c} \cdot \frac{1}{\tan \alpha_x} + p_y^f \end{cases}$$

wherein $(x_f, y_f)$ is a coordinate of the equivalent frame image, $\phi_c$ is a camera set pitch angle, $\alpha_x$ is an included angle of adjacent scanning lines, $(p_x^f, p_y^f)$ is a coordinate of an image principal point of the rotational linear array scanning image, and f is a lens focal length;

at step S103, by using structure-from-motion method, automatically calculating a pose parameter of the equivalent frame image and a corresponding waypoint three-dimensional coordinate;

at step S104, with the pose parameter of the equivalent frame image as an initial value, obtaining an accurate imaging parameter of the rotational linear array scanning image by an optimal estimation method.

Further, the collection parameter of the rotational linear array scanning image of step S101 comprises: the camera set pitch angle, the included angle of adjacent scanning lines, or an included angle of adjacent scanning lines obtained by calculation based on equivalent camera rotational velocity and an exposure time parameter;

wherein the included angle parameter $\alpha_x$ of adjacent scanning lines is obtained based on the exposure time t of the rotational cradle head velocity $\omega$: $\alpha_x = \omega t$; to ensure the scanning linear array image is not subjected to compression, or stretched deformation, the included angle of adjacent scanning lines is set to be same as an instantaneous field of view angle of the camera, the parameter is a requisite parameter for imaging of the rotational scanning linear array camera and obtained from meta data of an imaging set record or image file;

the camera set pitch angle refers to a dihedral angle between a plane where the principal optical axis of the camera is located and a plane perpendicular to a rotational shaft, which is also equivalent to an included angle of the scanning line and the rotational shaft.

Further, the lens focal length is expressed with pixel as unit, and directly calculated based on the lens focal length and a size of an imaging unit, or obtained by camera calibration method;

the coordinate of the image principal point is an image coordinate of an intersection point of the principal optical axis of the camera and the imaging plane; since the linear array camera has only one scanning line, the abscissa is 0 constantly, and the ordinate is also obtained by camera calibration or by using a coordinate of the central pixel as an approximate value;

the lens distortion parameter uses a Brown model and comprises a radial distortion and a tangential distortion, both of which only consider second-order parameter case, and for a camera without calibration parameter, 0 is used as an initial value of the distortion parameter.

Further, the camera set pitch angle $\phi\_c$ is obtained in the following manner:

(a) selecting a projection curve of one straight line in a scenario on the rotational scanning image, where the projection curve is not parallel to the scanning line;

(b) selecting three points on the projection curve, wherein the included angle of line segments between the three points is less than 180° and the line segments are not on one straight line;

(c) according to an equivalent frame projection formula, $$\begin{cases} x_f = \frac{\sin \omega}{\tan(\phi_c + \gamma)\sin \phi_c + \cos \omega \cos \phi_c} \cdot \frac{1}{\tan \alpha_x} + p_x^f \\ y_f = \frac{\tan(\phi_c + \gamma)\cos \phi_c - \cos \omega \sin \phi_c}{\tan(\phi_c + \gamma)\sin \phi_c + \cos \omega \cos \phi_c} \cdot \frac{1}{\tan \alpha_x} + p_y^f \end{cases}$$

projecting the above three points onto the equivalent frame image;

(d) according to a constraint that the three projection points on the equivalent frame image are on a same straight line, solving the camera set pitch angle.

Further, the general flow of the inverse projection transformation in step S102 is as follows:

(1) projecting four corner points of the rotational scanning image and the image principal point of the central scanning line to the equivalent frame image;

(2) according to a coordinate scope of the four corner points after projection, i.e. abscissas of the leftmost and rightmost pixels and ordinates of the lowermost and uppermost pixels, determining a length and a width of the equivalent frame image wherein a projection coordinate of the image principal point of the central scanning line is the coordinate of the image principal point of the equivalent frame image;

(3) calculating a coordinate of each pixel of the equivalent frame image inversely projected onto the rotational linear array scanning image;

(4) according to the rotational scanning linear array coordinate, resampling an image brightness value to obtain a pixel brightness value of the equivalent frame image.

Further, in step S102, the coordinate of each pixel of the equivalent frame image inversely projected to the rotational linear array scanning image is calculated based on inverse projection transformation calculation method in the following implementation:

for a rotational linear array scanning image having a total of m scanning lines, the coordinate of the central scanning line is m/2, the central scanning line is denoted as AB, and the principal optical axis corresponding to the central scanning line is OC and thus there is a relationship $\overline{AB} \perp \overline{OC}$;

1) calculating a vector expression v1 of a line $\overrightarrow{Op_f}$ connecting the point $p_f$ on the tangent plane and the corresponding projection center O;

specifically, firstly calculating the expressions of the line segments $\overline{OC}$ and $\overline{Cp_f}$ respectively;

$$\overrightarrow{OC} = [0, f\sin\phi_c, f\cos\phi_c]$$

$$\overrightarrow{Cp_f} = f\tan\alpha_x[(x_f - p_x^f), (y_f - p_y^f)\cos\phi_c, -(y_f - p_y^f)\sin\phi_c]$$

in the above formulas, calculating $v1 = \overrightarrow{OC} + \overrightarrow{Cp_f}$;

2) based on the above vector, calculating a rotational angle ω of the scanning line where the point $p_f$ is located with respect to the central scanning line and further calculating a scanning line coordinate $x_r$;

specifically, calculating $\overrightarrow{Op_f} = \overrightarrow{OC} + \overrightarrow{Cp_f}$, so as to obtain a rotation angle ω of the plane where the $\overrightarrow{Op_f}$ is located with respect to a visual plane of the central scanning line;

$$\omega = \arctan\left(\frac{x(\overrightarrow{Op_f})}{z(\overrightarrow{Op_f})}\right) = \arctan\left(\frac{(x_f - p_x^f)\tan\alpha_x}{\cos\phi_c - (y_f - p_y^f)\tan\alpha_x\sin\phi_c}\right)$$

and then, according to the included angle of adjacent scanning lines and the central scanning line coordinate, calculating a coordinate of an inverse projection point x on the rotational scanning image:

$$x_r = \omega/\alpha_x + p_x^r$$

3) calculating a vector expression v2 of the principal optical axis of the scanning line where the point $p_f$ is located;

the vector of the principal optical axis of the scanning line where the point $p_f$ is located, i.e. of the line segment $\overline{OC}$ rotating by an angle of ω around the rotation axis is expressed as:

$$v2 = [f\cos\phi_c\sin\omega, f\sin\phi_c, f\cos\phi_c\cos\omega]$$

4) calculating the included angle of v1 and v2, i.e. the included angle γ of the image point and the principal optical axis, and further calculating the ordinate $y_r$ of the scanning line;

specifically, according to the above expressions of v1 and v2, in combination with vector dot product calculation formula, obtaining the included angle γ of the $p_f$ and the principal optical axis of the scanning line where the point $p_f$ is located:

$$\gamma = \arccos\left(\frac{v1 \cdot v2}{|v1||v2|}\right)$$

finally, according to the lens focal length and the coordinate of the image principal point, calculating the final coordinate of the inverse projection point y:

$$y_r = f\tan\gamma + p_y^r$$

Further, the step S103 is implemented in the following manner:

for a rotational linear array scanning image, firstly using an automatic detection and matching method of feature point or manual point selection method to determine a homonymy point correspondence between images and then projecting coordinates of homonymy points of all images to the corresponding equivalent frame image, and finally using the existing structure-from-motion method, incremental SFM or global SFM method, or automatic three-dimensional reconstruction software, taking the focal length and the coordinate of the image principal point of the equivalent frame image as known parameters, and in a case of a condition of not performing optimization, restoring the pose parameter of the equivalent frame image and the waypoint three-dimensional coordinate corresponding to the homonymy point, wherein the pose parameter comprises a three-dimensional coordinate and an imaging pose of an image projection center.

the step S104 is specifically implemented in the following manner:

with any rectangular coordinate system as a world coordinate system, its coordinate value is $(X_w, Y_w, Z_w)$; with the rotational shaft of the rotational cradle head as y axis and the principal optical axis corresponding to the start scanning line as z axis, constructing a right-hand rectangular coordinate system as a sensor coordinate system, wherein its coordinate value is denoted as $(X_s, Y_s, Z_s)$; with the principal optical axis of a moment as z axis and the rotational shaft as y axis, constructing a right-hand rectangular coordinate system $X_t Y_t Z_t$ as a rotational cradle head coordinate system; with the projection center of the linear array camera as origin, the principal optical axis as z axis and y axis parallel to the scanning line, constructing a right-hand rectangular coordinate system $X_c Y_c Z_c$ as a camera coordinate system; with an upper left point of an imaging two-dimensional plane as origin and the scanning line as y axis, constructing a two-dimensional plane coordinate system uv as an image coordinate system, describing the transformation from the world coordinate system to the image coordinate system based on the following formula, i.e. a rigorous imaging model of the rotational scanning linear array camera:

$$\begin{bmatrix} f_x & 0 & p_x^r \\ 0 & f_y & p_y^r \\ 0 & 0 & 1 \end{bmatrix} R_{T \to C} \left( R_{S \to T} R_{W \to S} \begin{bmatrix} X_w - X_0 \\ Y_w - Y_0 \\ Z_w - Z_0 \end{bmatrix} + \begin{bmatrix} e_x \\ e_y \\ e_z \end{bmatrix} \right) = s \begin{bmatrix} 0 \\ v \\ 1 \end{bmatrix}$$

wherein $R_{T \to C}$ is a camera set matrix describing a camera set pose; $[e_x, e_y, e_z]^T$ is an offset vector of the camera coordinate system describing eccentricity of the camera setting; for convenience of descriptions, the origin of the rotational cradle head coordinate system is defined as projection of the origin of the camera coordinate system on the y axis of the rotational cradle head coordinate system, and thus $e_y=0$; $R_{S \to T}$, is a rotational cradle head rotation matrix describing a rotational angle of the rotational cradle head, which is generated by calculation using a single angle parameter; $R_{W \to S}$ and $[X_0, Y_0, Z_0]^T$ are a rotation matrix and a translation vector from the world coordinate system to the sensor coordinate system; s is a scale parameter; v is an ordinate of an image of the projection point; $f_y$ is a lens focal length value along the direction of y axis, $f_x$ is a lens focal length value along the direction of x axis, $(p_x^r, p_y^r)$ is a coordinate of an image principal point of the camera; for a rotational scanning linear array camera, the abscissa of the projection point is 0 constantly, and thus $p_x^r=0$, and the value $f_x$ does not affect the final position of the projection point, and therefore it is not a imaging model parameter;

$R_{T \to C}$ is obtained by multiplying the rotation matrices corresponding to a pitch angle $\phi_c$, a yaw angle $\omega_c$ and a roll angle $\kappa_c$ of the camera in the following formula:

$$R_{T \to C} = \begin{bmatrix} a_{11} & a_{12} & a_{13} \\ a_{21} & a_{22} & a_{22} \\ a_{31} & a_{32} & a_{33} \end{bmatrix}$$
$$= \begin{bmatrix} 1 & 0 & 0 \\ 0 & \cos\phi_c & -\sin\phi_c \\ 0 & \sin\phi_c & \cos\phi_c \end{bmatrix} \begin{bmatrix} \cos\omega_c & 0 & \sin\omega_c \\ 0 & 1 & 0 \\ -\sin\omega_c & 0 & \cos\omega_c \end{bmatrix} \begin{bmatrix} \cos\kappa_c & -\sin\kappa_c & 0 \\ \sin\kappa_c & \cos\kappa_c & 0 \\ 0 & 0 & 1 \end{bmatrix}$$

wherein $\alpha_{11}, \ldots, \alpha_{33}$ are parameters of the rotation matrices;

$R_{S \to T}$ is the rotational cradle head rotation matrix; since the rotational scanning imaging cradle head rotates around the y axis, the matrix is generated using a single angle parameter $\theta$ in the following calculation formula:

$$R_{S \to T} = \begin{bmatrix} \cos\theta & 0 & \sin\theta \\ 0 & 1 & 0 \\ -\sin\theta & 0 & \cos\theta \end{bmatrix}$$

$R_{W \to S}$ is a rotation matrix from the world coordinate system to the sensor coordinate system, which is also obtained by using three pose angles $(\phi_s, \omega_s, \kappa_s)$ in the following calculation formula:

$$R_{W \to S} = \begin{bmatrix} 1 & 0 & 0 \\ 0 & \cos\phi_s & -\sin\phi_s \\ 0 & \sin\phi_s & \cos\phi_s \end{bmatrix} \begin{bmatrix} \cos\omega_s & 0 & \sin\omega_s \\ 0 & 1 & 0 \\ -\sin\omega_s & 0 & \cos\omega_s \end{bmatrix} \begin{bmatrix} \cos\kappa_s & -\sin\kappa_s & 0 \\ \sin\kappa_s & \cos\kappa_s & 0 \\ 0 & 0 & 1 \end{bmatrix}$$

in a word, the rigorous imaging model of the rotational scanning linear array camera comprises a total of 14 parameters, i.e. the accurate imaging parameters of the rotational linear array scanning image, wherein, 2 camera intrinsic parameters: $f_y$ and $p_y^r$;
6 rotational cradle head parameters: $\theta$, $(\phi_c, \omega_c, \kappa_c)$, $e_x$, $e_z$;
6 extrinsic parameters of the imaging system: $(\phi_s, \omega_s, \kappa_s)$ and $[X_0, Y_0, Z_0]$;
through arrangement, the above rigorous imaging model is expressed as:

$$\begin{bmatrix} f_x & 0 & p_x^r \\ 0 & f_y & p_y^r \\ 0 & 0 & 1 \end{bmatrix} \begin{bmatrix} a_{11}\hat{X} + a_{12}\hat{Y} + a_{13}\hat{Z} \\ a_{21}\hat{X} + a_{22}\hat{Y} + a_{23}\hat{Z} \\ a_{31}\hat{X} + a_{32}\hat{Y} + a_{33}\hat{Z} \end{bmatrix} = s \begin{bmatrix} 0 \\ v \\ 1 \end{bmatrix}$$

wherein the calculation formula of the $[\hat{X}, \hat{Y}, \hat{Z}]^T$ is as follows:

$$\begin{bmatrix} \hat{X} \\ \hat{Y} \\ \hat{Z} \end{bmatrix} = \begin{bmatrix} X_s \cos(\theta) - Z_s \sin(\theta) - e_x \\ Y_s \\ X_s \sin(\theta) - Z_s \cos(\theta) - e_x \end{bmatrix}$$

in this case, an analytical expression of the image coordinate of the projection point is solved:

$$\begin{cases} y = f_y \dfrac{a_{21}\hat{X} + a_{22}\hat{Y} + a_{23}\hat{Z}}{a_{31}\hat{X} + a_{32}\hat{Y} + a_{33}\hat{Z}} + p_y^r \\ x = \dfrac{1}{a_x} \arcsin\left( \dfrac{-bc \pm |a|\sqrt{a^2 + b^2 - c^2}}{a^2 + b^2} \right) + p_x^r \end{cases}$$

wherein, $$\begin{cases} a = a_{11}X_s + a_{13}Z_s \\ b = a_{13}X_s - a_{11}Z_s \\ c = a_{12}Y_s - a_{11}e_x - a_{13}e_z \end{cases}$$

Compared with the prior arts, the disclosure has the following advantages and beneficial effects.

The disclosure provides a precision calculation method of a pose of a multi-view rotational linear array image based on an equivalent frame image, which solves the problem that a rotational scanning linear array imaging model cannot use iterative optimization algorithm to solve an accurate pose parameter in a case of no good initial value of a camera pose parameter due to high complexity and nonlinearity, achieving automatic and high precision restoration of the pose of the rotational linear array scanning image without using external devices to measure image pose parameter, and thus providing basis for three-dimensional reconstruction of the rotational linear array scanning image.

DETAILED DESCRIPTION OF THE EMBODIMENTS

To make the objects, technical solutions and advantages of the embodiments of the disclosure clearer, the specific embodiments of the disclosure will be further described in details in combination with accompanying drawings of the disclosure. The following embodiments are used to describe the disclosure rather than limit the disclosure.

An embodiment of the disclosure implements a precision calculation method of a pose of a multi-view rotational linear array image based on an equivalent frame image. The method can, according to a homonymy point correspondence relationship between multi-view rotational linear array images, automatically solve high accuracy intrinsic and extrinsic parameters and waypoint three-dimensional coordinates of the image.

Figure 1:
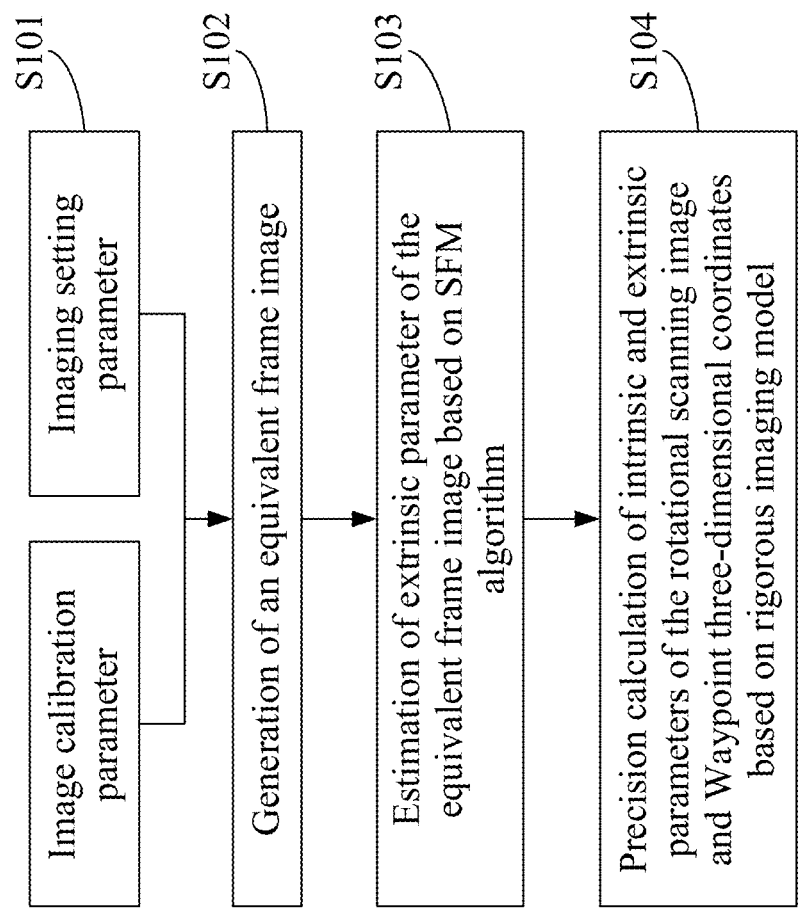
FIG. 1 is a flowchart illustrating a precision calculation method of a pose of a multi-view rotational linear array image based on an equivalent frame image according to an embodiment of the disclosure.

FIG. 1 is a flowchart illustrating a wave band selection method according to an embodiment of the disclosure. As shown in FIG. 1, the method comprises the following steps.

At step S101, a collection parameter of a rotational linear array scanning image and a camera intrinsic parameter are obtained.

In an embodiment of the disclosure, the collection parameter of the rotational linear array scanning image comprises an included angle of adjacent scanning lines and a camera set pitch angle.

The included angle parameter $\alpha_x$ of adjacent scanning lines may be obtained based on the exposure time t of the rotational cradle head velocity $\omega$: $\alpha_x = \omega t$; to ensure the scanning linear array image is not subjected to compression, or stretched deformation, the included angle of adjacent scanning lines is usually set to be same as an instantaneous field of view angle of the camera. The parameter is a requisite parameter for imaging of the rotational scanning linear array camera and may be obtained from meta data of an imaging set record or image file.

Figures 2A, 2B:
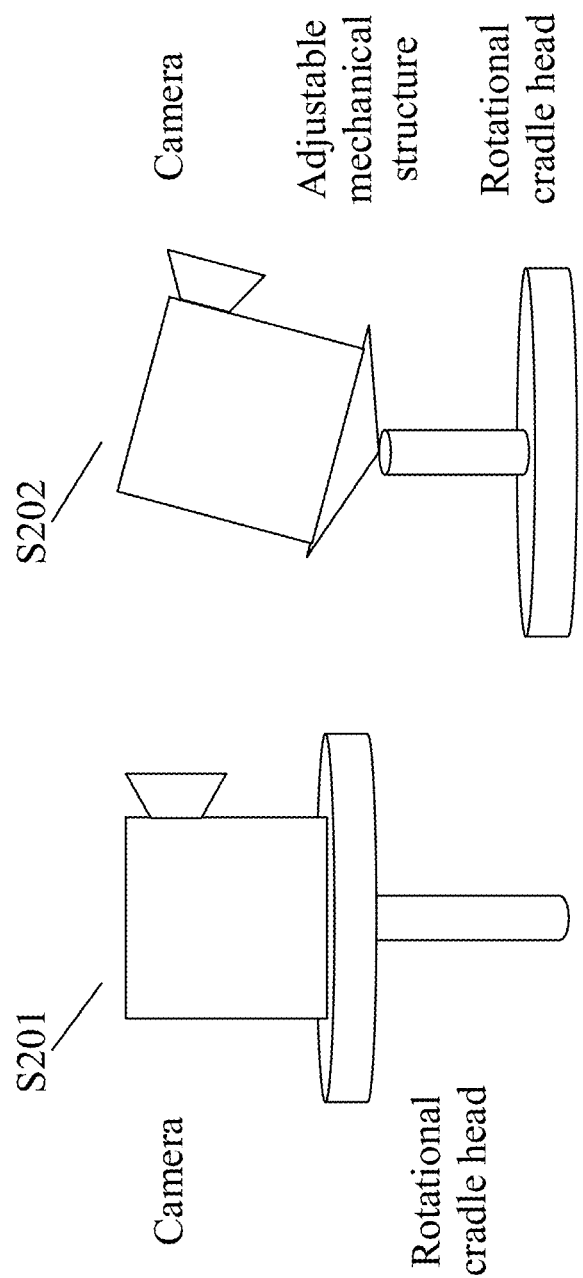
FIGS. 2A-2B are schematic diagrams illustrating a camera set pitch angle of a linear array camera according to an embodiment of the disclosure.

The camera set pitch angle refers to a dihedral angle between a plane where the principal optical axis of the camera is located and a plane perpendicular to the rotational shaft, which is also equivalent to an included angle of the scanning line and the rotational shaft. In this embodiment, two typical setting forms of the hyperspectral linear array rotational scanning camera are considered. As shown in FIGS. 2A-2B, in step S201, the camera is directly fixed on the rotational cradle head and at this time, the camera set pitch angle is always unchanged and approximate to 0°. In step S202, the camera is fixed on the rotational shaft through an adjustable mechanical structure and the pitch angle is adjusted through the mechanical device between the camera and the rotational shaft, so as to facilitate obtaining images of targets of different heights. Under this condition, a level gauge may be used to measure the camera pitch angle.

In this embodiment, the camera intrinsic parameter comprises a lens focal length of the camera, a coordinate of an image principal point, and lens radial and tangential distortion parameters.

The lens focal length is expressed with pixel as unit, and directly calculated based on the lens focal length and a size of an imaging unit, or obtained by camera calibration method.

The coordinate of the image principal point is an image coordinate of an intersection point of the principal optical axis of the camera and the imaging plane; since the linear array camera has only one scanning line, the abscissa is 0 constantly, and the ordinate is also obtained by camera calibration or by using a coordinate of the central pixel as an approximate value.

The lens distortion parameter uses a Brown model and comprises a radial distortion and a tangential distortion, both of which only consider second-order parameter case, and for a camera without calibration parameter, 0 may be used as an initial value of the distortion parameter.

At step S102, according to the camera intrinsic parameter and the image collection parameter of the step S101, the rotational linear array scanning image is projected to its tangent plane by orthographic projection transformation to generate an equivalent frame image having the approximately same intrinsic and extrinsic parameters as the rotational linear array scanning image and calculate a coordinate of each pixel of the equivalent frame image projected onto the rotational linear array scanning image based on an inverse projection transformation calculation method.

In this embodiment, with a rotational scanning linear array camera with an adjustable pitch angle as an example, a method of constructing the tangent plane of the rotational linear array scanning image and a transformation calculation method of orthographic projection and inverse projection of the equivalent frame image are described. For a linear array scanning imaging device as in step S201, by setting the pitch angle in the model to 0, a corresponding projection transformation model is obtained and an equivalent frame image is generated.

Figure 3:
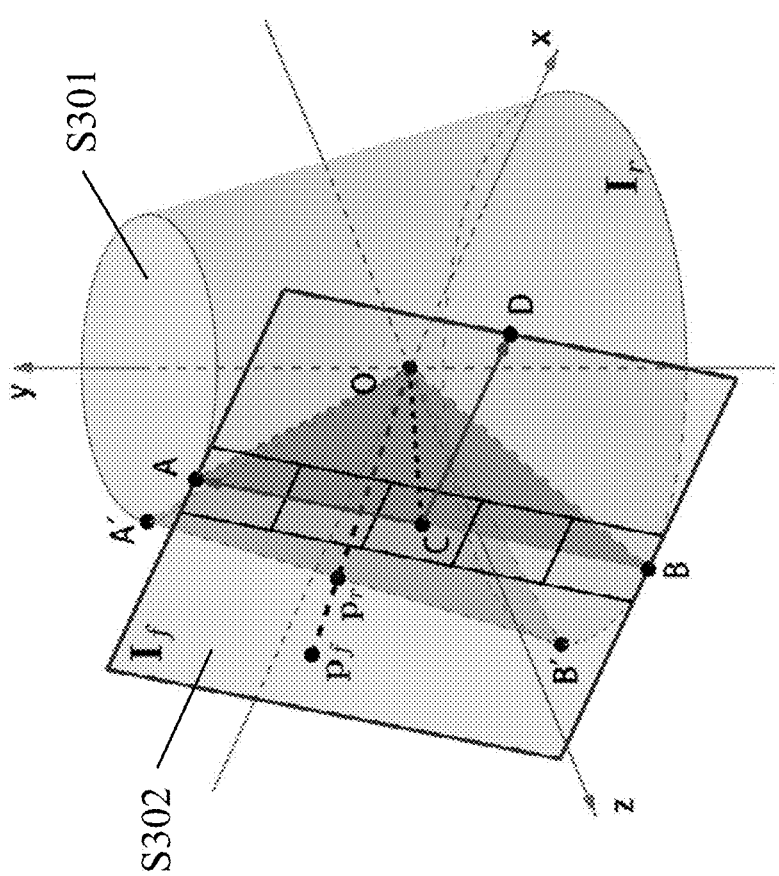
FIG. 3 is a schematic diagram illustrating an equivalent frame imaging model of a rotational scanning linear array camera according to an embodiment of the disclosure.
Figure 4:
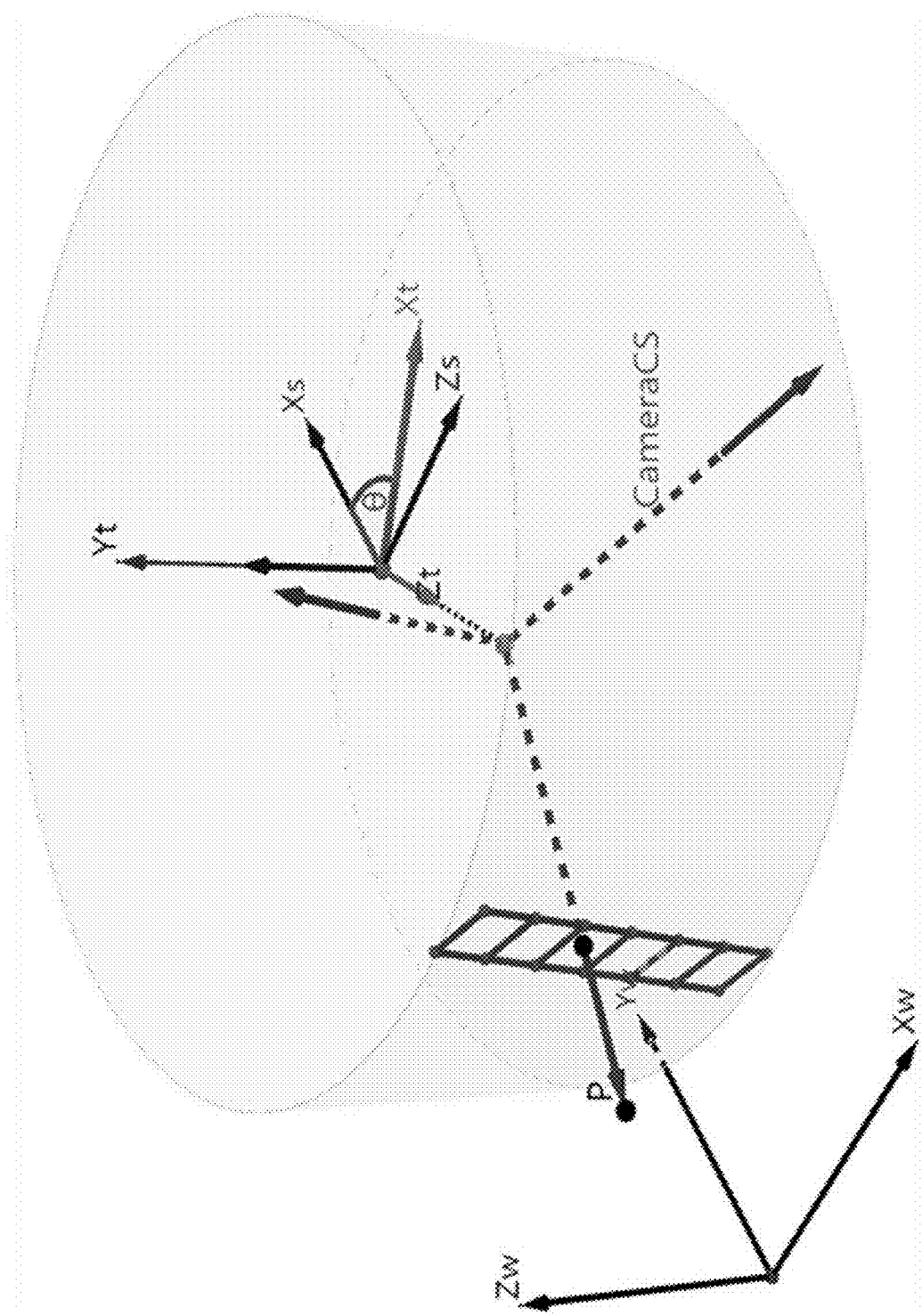
FIG. 4 is a rigorous imaging model of a linear array camera according to an embodiment of the disclosure.

Specifically, as shown in FIG. 3, a vertical surface of a truncated cone S301 is an imaging plane formed by an imaging linear array trajectory of the rotational scanning linear array camera. For a rotational linear array scanning image with a total of m scanning lines, the coordinate of the central scanning line is m/2, the central scanning line is denoted as a straight line AB on the truncated cone in the drawing, and the principal optical axis corresponding to the central scanning line AB is OC and thus there is a relationship $\overline{AB} \perp \overline{OC}$. The plane S302 is tangent to the plane S301 of the truncated cone at the straight line AB, and the plane S302 is an imaging plane of the equivalent frame image. The imaging plane ensures the projected image has the same camera focal length as the raw image.

For the orthographic projection transformation, a point on the rotational linear array scanning image is projected to the equivalent frame image. For a particular point $p_r$ on the rotational scanning imaging plane, its image coordinate is $(x_r, y_r)$, a rotation angle of the scanning line where the image is located with respect to the central scanning line is $\omega$, and an included angle between an incident ray of the point and a principal optical axis of the scanning line where the point is located is $\gamma$, and both are calculated as follows:

$$\omega = (x_r - p_x^r)\alpha_x;$$

$$\gamma = \arctan\frac{y_r - p_y^r}{f};$$

where $p_x^r$ is an abscissa of the central scanning line, and $p_y^r$ is an ordinate of an image principal point of the rotational linear array scanning image.

Based on based on projection relationship shown in FIG. 3, a coordinate of an intersection point $p_f$ of the incident line of the point $p_r$ and the equivalent frame imaging plane under an equivalent frame image coordinate system is calculated in the following formula:

$$\begin{cases} x_f = \dfrac{\sin\omega}{\tan(\phi_c+\gamma)\sin\phi_c + \cos\omega\cos\phi_c} \cdot \dfrac{1}{\tan\alpha_x} + p_x^f \\ y_f = \dfrac{\tan(\phi_c+\gamma)\cos\phi_c - \cos\omega\sin\phi_c}{\tan(\phi_c+\gamma)\sin\phi_c + \cos\omega\cos\phi_c} \cdot \dfrac{1}{\tan\alpha_x} + p_y^f \end{cases}$$

wherein $(x_f, y_f)$ is a coordinate of the equivalent frame image, $(x_r, y_r)$ is a coordinate of the rotational linear array scanning image, $\phi_c$ is a camera set pitch angle, $\alpha_x$ is an included angle of adjacent scanning lines, $(p_x^f, p_y^f)$ is a coordinate of an image principal point of the rotational linear array scanning image, and f is a lens focal length.

The above transformation is usually applied to use in projecting a known homonymy point on the rotational scanning image to the equivalent frame image, and next, according to the coordinate of the projected homonymy point on the equivalent frame image, an imaging pose parameter of the equivalent frame image is calculated.

In another case, the equivalent frame image is directly generated in a general flow as follows:

1) projecting four corner points of the rotational scanning image and the image principal point of the central scanning line to the equivalent frame image;
2) according to a coordinate scope of the four corner points after projection, i.e. abscissas of the leftmost and rightmost pixels and ordinates of the lowermost and uppermost pixels, determining a length and a width of the equivalent frame image wherein a projection coordinate of the image principal point of the central scanning line is the coordinate of the image principal point of the equivalent frame image;
3) calculating a coordinate of each pixel of the equivalent frame image inversely projected onto the rotational linear array scanning image;
4) according to the rotational scanning linear array coordinate, resampling an image brightness value to obtain a pixel brightness value of the equivalent frame image.

In this flow, the key step is calculating the coordinate of each pixel of the equivalent frame image inversely projected onto the rotational linear array scanning image. Since inverse calculation cannot be performed directly based on the above orthographic projection transformation formula, in this embodiment, as shown in FIG. 3, the inverse projection transformation calculation is performed in the following steps:

1) A vector expression v1 of a line $\overrightarrow{Op_f}$ connecting the point $p_f$ on the tangent plane and the corresponding projection center O is calculated;

specifically, firstly, the expressions of the line segments $\overrightarrow{OC}$ and $\overrightarrow{Cp_f}$ are calculated respectively;

$\overrightarrow{OC}=[0, f\sin\phi_c, f\cos\phi_c]$ $\overrightarrow{Cp_f}=f\tan\alpha_x[(x_f-p_x^f),(y_f-p_y^f)\cos\phi_c,-(y_f-p_y^f)\sin\phi_c]$ in the above formulas, $v1=\overrightarrow{OC}+\overrightarrow{Cp_f}$ is calculated.

2) based on the above vector, a rotational angle ω of the scanning line where the point $p_f$ is located with respect to the central scanning line is calculated and further, a scanning line coordinate $x_r$ is calculated.

Specifically, $\overrightarrow{Op_f}=\overrightarrow{OC}+\overrightarrow{Cp_f}$ is calculated so as to obtain a rotation angle ω of the plane where the $\overrightarrow{Op_f}$ is located with respect to a visual plane of the central scanning line;

$$\omega = \arctan\left(\frac{x(\overrightarrow{Op_f})}{z(\overrightarrow{Op_f})}\right) = \arctan\left(\frac{(x_f-p_x^f)\tan\alpha_x}{\cos\phi_c - (y_f-p_y^f)\tan\alpha_x\sin\phi_c}\right)$$

next, according to the included angle of adjacent scanning lines and the central scanning line coordinate, a coordinate of an inverse projection point x on the rotational scanning image is calculated:

$x_r=\omega/\alpha_x+p_x^r$ 3) a vector expression v2 of the principal optical axis of the scanning line where the point $p_f$ is located is calculated.

The vector of the principal optical axis of the scanning line where the point $p_f$ is located, i.e. of the line segment $\overrightarrow{OC}$ rotating by an angle of co around the rotation axis is expressed as:

$v2=[f\cos\phi_c\sin\omega, f\sin\phi_c, f\cos\phi_c\cos\omega]$

4) The included angle of v1 and v2, i.e. the included angle $\gamma$ of the image point and the principal optical axis is calculated, and further, the ordinate $y_r$ of the scanning line is calculated.

Specifically, according to the above expressions of v1 and v2, in combination with vector dot product calculation formula, the included angle $\gamma$ of the $p_f$ and the principal optical axis of the scanning line where the point $p_f$ is located is obtained:

$$\gamma = \arccos\left(\frac{v1\cdot v2}{|v1||v2|}\right)$$

Finally, according to the lens focal length and the coordinate of the image principal point, the final coordinate of the inverse projection point y is calculated:

$y_r=f\tan\gamma+p_y^r$

At step S103, by using structure-from-motion method, a pose parameter of the equivalent frame image and a corresponding waypoint three-dimensional coordinate are automatically calculated.

Specifically, in this embodiment, for a rotational linear array scanning image, an automatic detection and matching method of feature point or manual point selection method is firstly used to determine a homonymy point correspondence between images and then coordinates of homonymy points of all images are projected to the corresponding equivalent frame image, and finally, by using the existing structure-from-motion (SFM) method, incremental SFM or global SFM method, or automatic three-dimensional reconstruction software such as COLMAP, AliceVision or Agisoft-Metashape, the focal length and the coordinate of the image principal point of the equivalent frame image are taken as known parameters, and in a case of a condition of not performing optimization, the pose parameter of the equivalent frame image (a three-dimensional coordinate and an imaging pose of an image projection center) and the waypoint three-dimensional coordinate corresponding to the homonymy point are restored.

At step S104, with the pose parameter of the equivalent frame image as an initial value, an accurate imaging parameter of the rotational linear array scanning image is obtained by an optimal estimation method.

Firstly, in this embodiment, in combination with multiple existing linear array camera imaging models and system error description methods, the construction of the imaging process model of the rotational scanning linear array camera is accurately described by transformation among five coordinate systems "world coordinate system↔sensor coordinate system↔rotational cradle head coordinate system↔camera coordinate system↔image coordinate system".

As shown below, in this embodiment, with any rectangular coordinate system as a world coordinate system, its coordinate value is $(X_w, Y_w, Z_w)$; with the rotational shaft of the rotational cradle head as y axis and the principal optical axis corresponding to the start scanning line as z axis, a right-hand rectangular coordinate system is constructed as a sensor coordinate system, wherein its coordinate value is denoted as $(X_s, Y_s, Z_s)$; with the principal optical axis of a moment as z axis and the rotational shaft as y axis, a right-hand rectangular coordinate system $X_t Y_t Z_t$ is constructed as a rotational cradle head coordinate system; with the projection center of the linear array camera as origin, the principal optical axis as z axis and y axis parallel to the scanning line, a right-hand rectangular coordinate system $X_c Y_c Z_c$ is constructed as a camera coordinate system; with an upper left point of an imaging two-dimensional plane as origin and the scanning line as y axis, a two-dimensional plane coordinate system uv is constructed as an image coordinate system, and thus the transformation from the world coordinate system to the image coordinate system is described based on the following formula, i.e. a rigorous imaging model of the rotational scanning linear array camera:

$$\begin{bmatrix} f_x & 0 & p_x^r \\ 0 & f_y & p_y^r \\ 0 & 0 & 1 \end{bmatrix} R_{T \to C} \left( R_{S \to T} R_{W \to S} \begin{bmatrix} X_w - X_0 \\ Y_w - Y_0 \\ Z_w - Z_0 \end{bmatrix} + \begin{bmatrix} e_x \\ e_y \\ e_z \end{bmatrix} \right) = s \begin{bmatrix} 0 \\ v \\ 1 \end{bmatrix}$$

wherein $R_{T \to C}$ is a camera set matrix describing a camera set pose; $[e_x, e_y, e_z]^T$ is an offset vector of the camera coordinate system describing eccentricity of the camera setting; for convenience of descriptions, the origin of the rotational cradle head coordinate system is defined as projection of the origin of the camera coordinate system on the y axis of the rotational cradle head coordinate system, and thus $e_y = 0$; $R_{S \to T}$ is a rotational cradle head rotation matrix describing a rotational angle of the rotational cradle head, which is generated by calculation using a single angle parameter; $R_{W \to S}$ and $[X_0, Y_0, Z_0]^T$ are a rotation matrix and a translation vector from the world coordinate system to the sensor coordinate system; s is a scale parameter; v is an ordinate of an image of the projection point; $f_y$ is a lens focal length value along the direction of y axis, $f_x$ is a lens focal length value along the direction of x axis, $(p_x^r, p_y^r)$ is a coordinate of an image principal point of the camera; for a rotational scanning linear array camera, the abscissa of the projection point is 0 constantly, and thus $p_x^r = 0$, and the value $f_x$ does not affect the final position of the projection point, and therefore it is not a imaging model parameter;

$R_{T \to C}$ is obtained by multiplying the rotation matrices corresponding to a pitch angle $\phi_c$, a yaw angle $\omega_c$ and a roll angle $\kappa_c$ of the camera in the following formula:

$$R_{T \to C} = \begin{bmatrix} a_{11} & a_{12} & a_{13} \\ a_{21} & a_{22} & a_{23} \\ a_{31} & a_{32} & a_{33} \end{bmatrix} =$$

$$\begin{bmatrix} 1 & 0 & 0 \\ 0 & \cos\phi_c & -\sin\phi_c \\ 0 & \sin\phi_c & \cos\phi_c \end{bmatrix} \begin{bmatrix} \cos\omega_c & 0 & \sin\omega_c \\ 0 & 1 & 0 \\ -\sin\omega_c & 0 & \cos\omega_c \end{bmatrix} \begin{bmatrix} \cos\kappa_c & -\sin\kappa_c & 0 \\ \sin\kappa_c & \cos\kappa_c & 0 \\ 0 & 0 & 1 \end{bmatrix}$$

wherein $\alpha_{11}, \ldots, \alpha_{33}$ are parameters of the rotation matrices.

$R_{S \to T}$ is the rotational cradle head rotation matrix; since the rotational scanning imaging cradle head rotates around the y axis, the matrix is generated using a single angle parameter $\theta$ in the following calculation formula:

$$R_{S \to T} = \begin{bmatrix} \cos\theta & 0 & \sin\theta \\ 0 & 1 & 0 \\ -\sin\theta & 0 & \cos\theta \end{bmatrix}$$

$R_{W \to S}$ is a rotation matrix from the world coordinate system to the sensor coordinate system, which is also obtained by using three pose angles $(\phi_s, \omega_s, \kappa_s)$ in the following calculation formula:

$$R_{W \to S} = \begin{bmatrix} 1 & 0 & 0 \\ 0 & \cos\phi_s & -\sin\phi_s \\ 0 & \sin\phi_s & \cos\phi_s \end{bmatrix} \begin{bmatrix} \cos\omega_s & 0 & \sin\omega_s \\ 0 & 1 & 0 \\ -\sin\omega_s & 0 & \cos\omega_s \end{bmatrix} \begin{bmatrix} \cos\kappa_s & -\sin\kappa_s & 0 \\ \sin\kappa_s & \cos\kappa_s & 0 \\ 0 & 0 & 1 \end{bmatrix}$$

In a word, the rigorous imaging model of the rotational scanning linear array camera comprises a total of 14 parameters, wherein, 2 camera intrinsic parameters: $f_y$ and $p_y^r$;

6 rotational cradle head parameters: $\theta$, $(\phi_c, \omega_c, \kappa_c)$, $e_x$, $e_z$;

6 extrinsic parameters of the imaging system: $(\phi_s, \omega_s, \kappa_s)$ and $[X_0, Y_0, Z_0]$;

through arrangement, the above rigorous imaging model is expressed as:

$$\begin{bmatrix} f_x & 0 & p_x^r \\ 0 & f_y & p_y^r \\ 0 & 0 & 1 \end{bmatrix} \begin{bmatrix} a_{11}\hat{X} + a_{12}\hat{Y} + a_{13}\hat{Z} \\ a_{21}\hat{X} + a_{22}\hat{Y} + a_{23}\hat{Z} \\ a_{31}\hat{X} + a_{32}\hat{Y} + a_{33}\hat{Z} \end{bmatrix} = s \begin{bmatrix} 0 \\ v \\ 1 \end{bmatrix}$$

wherein the calculation formula of the $[\hat{X}, \hat{Y}, \hat{Z}]^T$ is as follows:

$$\begin{bmatrix} \hat{X} \\ \hat{Y} \\ \hat{Z} \end{bmatrix} = \begin{bmatrix} X_s \cos(\theta) - Z_s \sin(\theta) - e_x \\ Y_s \\ X_s \sin(\theta) + Z_s \cos(\theta) - e_z \end{bmatrix}$$

in this case, an analytical expression of the image coordinate of the projection point is solved:

$$\begin{cases} y = f_y \dfrac{a_{21}\hat{X} + a_{22}\hat{Y} + a_{23}\hat{Z}}{a_{31}\hat{X} + a_{32}\hat{Y} + a_{33}\hat{Z}} + p_y^r \\ x = \dfrac{1}{a_x} \arcsin\left( \dfrac{-bc \pm |a|\sqrt{a^2 + b^2 - c^2}}{a^2 + b^2} \right) + p_x^r \end{cases}$$

wherein, $$\begin{cases} a = a_{11}X_s + a_{13}Z_s \\ b = a_{13}X_s - a_{11}Z_s \\ c = a_{12}Y_s - a_{11}e_x - a_{13}e_z \end{cases}$$

It is noted that, in the above analytical expression of the image coordinate of the projection point, x coordinate has two solutions which correspond to a physical meaning that there are two intersection points between one incident ray and the imaging truncated cone surface. In this embodiment, we carry out discussions as to the following special case: a scanning angle of the rotational scanning image is less than 180° and at this time, there is only one intersection point between the incident ray and the truncated cone imaging plane of the rotational scanning image; by analyzing the value range of each parameter under the imaging condition, it is found that the coordinate of the unique projection point x may be calculated in the following expression:

$$x = \frac{1}{a_x}\arcsin\left(\frac{-bc + |a|\sqrt{a^2 + b^2 - c^2}}{a^2 + b^2}\right) + p_x^r$$

Based on the above analytical expression of the coordinate of the projection point, according to the waypoint three-dimensional coordinate obtained based on the equivalent frame image and the initial values of the intrinsic and extrinsic parameters of the image, a residual of the coordinate of the projection point is constructed, and according to the least square method, the Levenberg-Marquardt is used to perform joint optimization for a total of 14 imaging parameters, comprising camera intrinsic parameter, rotational cradle head parameter, and extrinsic parameter of the imaging system, and all waypoint three-dimensional coordinates, so as to finally obtain an accurate reconstructed three-dimensional point coordinate and an imaging parameter.

In this embodiment, when the camera pitch angle parameter cannot be measured actually due to various reasons, for example, for unavailability of corresponding angle measuring device or inability to adjust the rotational shaft to be vertical state or the like, the orthographic projection transformation may be used to solve the set pitch angle $\phi_c$ of the linear array camera in the following steps:

1) A projection curve of one straight line in a scenario on the rotational scanning image is selected, where the projection curve is not parallel to the scanning line.

Figure 5A:
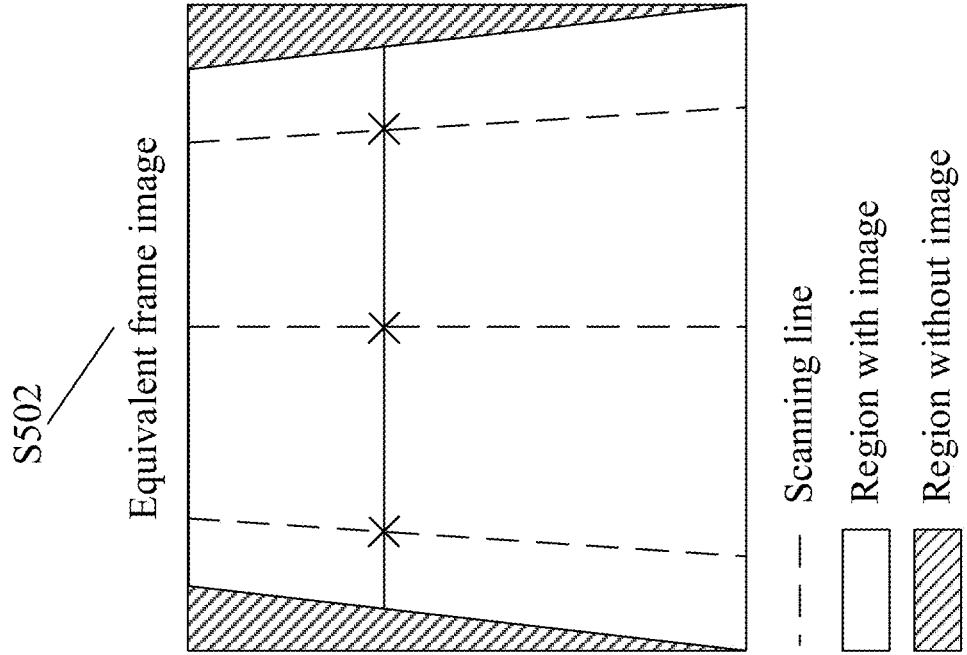
FIGS. 5A-5B are schematic diagrams of estimating a set pitch angle of a rotational linear array scanning image based on a straight line in a scenario according to an embodiment of the disclosure.
Figure 5B:
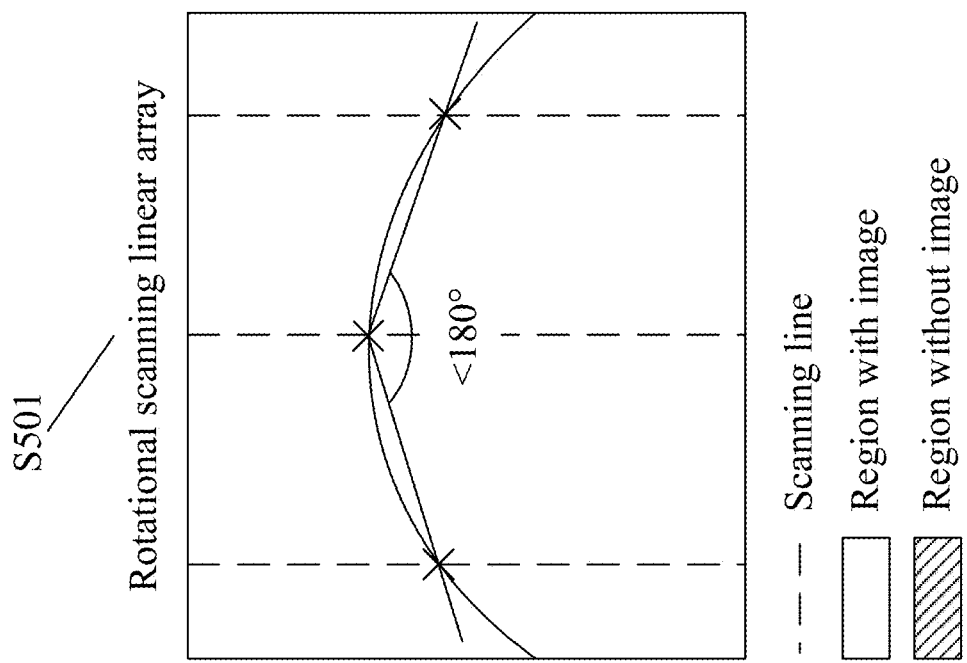

In the rotational scanning image shown in FIGS. 5A-5B, each column of the image is one scanning line; the actual object corresponding to the curve shown is a straight line, and its projection on the image is one curve.

2) Three points are selected on the projection curve. As shown in S501, the included angle of line segments between the three points is less than 180° and the line segments are not on one straight line.

3) According to an equivalent frame projection formula, $$\begin{cases} x_f = \dfrac{\sin\omega}{\tan(\phi_c + \gamma)\sin\phi_c + \cos\omega\cos\phi_c} \cdot \dfrac{1}{\tan\alpha_x} + p_x^f \\ y_f = \dfrac{\tan(\phi_c + \gamma)\cos\phi_c - \cos\omega\sin\phi_c}{\tan(\phi_c + \gamma)\sin\phi_c + \cos\omega\cos\phi_c} \cdot \dfrac{1}{\tan\alpha_x} + p_y^f \end{cases},$$

the above three points are projected onto the equivalent frame image.

4) According to a constraint that the three projection points on the equivalent frame image are on a same straight line, the camera set pitch angle is solved.

According to the projective geometry principle, the corresponding projection of one straight line in a space on the frame image is still one straight line and thus, the coordinates of the above selected three points on the equivalent frame image should satisfy the following collinear relationship:

$$\frac{x_1^f - x_2^f}{y_1^f - y_2^f} = \frac{x_1^f - x_3^f}{y_1^f - y_3^f}$$

Therefore, according to the collinear relationship constraint and the equivalent frame projection transformation formula, the camera set pitch angle can be solved.

The specific solution is to calculate the analytical solution directly or solve using a brute force exhaustive method based on a set accuracy. As shown in S502, when the solved set pitch angle is same as a real pitch angle, the above three points are on a same straight line, where the calculation result of the set pitch angle may be taken as an initial value for performing subsequent iterative optimization calculation.

The above descriptions are merely specific embodiments of the disclosure but the disclosure is not limited hereto. Any changes or replacements easily thought of by those skilled in the art within the technical scope of the disclosure shall all fall within the scope of protection of the disclosure. Therefore, the scope of protection of the disclosure is indicated by the appended claims.

What is claimed is:

1. A computer-implemented automatic precision calculation method of an imaging pose of a rotational linear array scanning image, the method comprising:

at step S101, using a linear array camera provided on a rotational cradle head to collect one group of rotational linear array scanning images and recording a collection parameter of the rotational linear array scanning image and a camera intrinsic parameter;

at step S102, according to the camera intrinsic parameter and the image collection parameter of the step S101, projecting the rotational linear array scanning image to a tangent plane of the rotational linear array scanning image by orthographic projection transformation to generate an equivalent frame image having the approximately same intrinsic and extrinsic parameters as the rotational linear array scanning image and calculate a coordinate of each pixel of the equivalent frame image projected onto the rotational linear array scanning image based on an inverse projection transformation calculation method;

at step S102, the tangent plane being tangent to an image plane of the rotational linear array scanning image at a central scanning line, and projecting the rotational linear array scanning image to the tangent plane of the image in the following implementation:

for a particular point $p_r$ on the rotational scanning imaging plane, a coordinate of image is $(x_r, y_r)$, a rotation angle of the central scanning line with respect to the central scanning line is $\omega$, an included angle between an incident ray of the point and a principal optical axis of the central scanning line where the point is located is $\gamma$, and both are calculated as follows:

$$\omega = (x_r - p_x^r)\alpha_x;$$

$$\gamma = \arctan\frac{y_r - p_y^r}{f};$$

wherein $p_x^r$ is an abscissa of the central scanning line, and $p_y^r$ is an ordinate of an image principal point of the rotational linear array scanning image;

based on projection relationship, a coordinate of an intersection point $p_f$ of the incident line of the point $p_r$ and the equivalent frame imaging plane under an equivalent frame image coordinate system is calculated in the following formula:

$$\begin{cases} x_f = \dfrac{\sin\omega}{\tan(\phi_c + \gamma)\sin\phi_c + \cos\omega\cos\phi_c} \cdot \dfrac{1}{\tan\alpha_x} + p_x^f \\ y_f = \dfrac{\tan(\phi_c + \gamma)\cos\phi_c - \cos\omega\sin\phi_c}{\tan(\phi_c + \gamma)\sin\phi_c + \cos\omega\cos\phi_c} \cdot \dfrac{1}{\tan\alpha_x} + p_y^f \end{cases};$$

wherein $(x_f, y_f)$ is a coordinate of the equivalent frame image, $\phi_c$ is a camera set pitch angle, $\alpha_x$ is an included angle of adjacent scanning lines, $(p_x^f, p_y^f)$ is a coordinate of an image principal point of the rotational linear array scanning image, and f is a lens focal length;

at step S103, by using structure-from-motion method, automatically calculating a pose parameter of the equivalent frame image and a corresponding waypoint three-dimensional coordinate; and at step S104, with the pose parameter of the equivalent frame image as an initial value, obtaining an accurate imaging parameter of the rotational linear array scanning image by an optimal estimation method.

2. The method of claim 1, wherein, the collection parameter of the rotational linear array scanning image of step S101 comprises: the camera set pitch angle, the included angle of adjacent scanning lines, or an included angle of adjacent scanning lines obtained by calculation based on equivalent camera rotational velocity and an exposure time, and a lens distortion parameter;

the included angle parameter $\alpha_x$ of adjacent scanning lines is obtained based on the exposure time t of the rotational cradle head velocity $\omega$: $\alpha_x = \omega t$; to ensure the scanning linear array image is not subjected to compression, or stretched deformation, the included angle of adjacent scanning lines is set to be same as an instantaneous field of view angle of the linear array camera, the included angle is a requisite parameter for imaging of the rotational scanning linear array camera and obtained from meta data of an imaging set record or image file; and the camera set pitch angle refers to a dihedral angle between a plane where the principal optical axis of the linear array camera is located and a plane perpendicular to a rotational shaft of the linear array camera, which is also equivalent to an included angle of the scanning line and the rotational shaft.

3. The method of claim 1, wherein, the camera intrinsic parameter in step S101 comprises a lens focal length, a coordinate of an image principal point and lens radial and tangential distortion parameters;

the lens focal length is expressed with pixel as unit, and directly calculated based on the lens focal length and a size of an imaging unit, or obtained by camera calibration method;

the coordinate of the image principal point is an image coordinate of an intersection point of the principal optical axis of the camera and the imaging plane of linear array camera; since the linear array camera has only one scanning line, the abscissa is 0 constantly, and the ordinate is obtained by camera calibration or by using a coordinate of the central pixel as an approximate value; and the lens distortion parameter uses a Brown model and comprises a radial distortion and a tangential distortion, both of which only consider second-order parameter case, and for a camera without calibration parameter, 0 is used as an initial value of the lens distortion parameter.

4. The method of claim 1, wherein, the camera set pitch angle (I), is obtained in the following manner:

(a) selecting a projection curve of one straight line in a scenario on the rotational linear array scanning image, where the projection curve is not parallel to any scanning lines;

(b) selecting three points on the projection curve, wherein an included angle of line segments between the three points is less than 180° and the line segments are not on one straight line;

(c) according to an equivalent frame projection formula, $$\begin{cases} x_f = \dfrac{\sin\omega}{\tan(\phi_c + \gamma)\sin\phi_c + \cos\omega\cos\phi_c} \cdot \dfrac{1}{\tan\alpha_x} + p_x^f \\ y_f = \dfrac{\tan(\phi_c + \gamma)\cos\phi_c - \cos\omega\sin\phi_c}{\tan(\phi_c + \gamma)\sin\phi_c + \cos\omega\cos\phi_c} \cdot \dfrac{1}{\tan\alpha_x} + p_y^f \end{cases},$$

projecting the above three points onto the equivalent frame image; and (d) according to a constraint that the three projection points on the equivalent frame image are on a same straight line, solving the camera set pitch angle.

5. The method of claim 1, wherein, a general flow of the inverse projection transformation calculation method in step S102 is as follows:

(1) projecting four corner points of the rotational linear array scanning image and the image principal point of the central scanning line to the equivalent frame image;

(2) according to a coordinate scope of the four corner points after projection, i.e. abscissas of leftmost and rightmost pixels and ordinates of lowermost and uppermost pixels, determining a length and a width of the equivalent frame image wherein a projection coordinate of the image principal point of the central scanning line is the coordinate of the image principal point of the equivalent frame image;

(3) calculating a coordinate of each pixel of the equivalent frame image inversely projected onto the rotational linear array scanning image; and (4) according to the rotational scanning linear array coordinate, resampling an image brightness value to obtain a pixel brightness value of the equivalent frame image.

6. The method of claim 5, wherein, in step S102, the coordinate of each pixel of the equivalent frame image inversely projected to the rotational linear array scanning image is calculated based on inverse projection transformation calculation method in the following implementation:

for a rotational linear array scanning image having a total of m scanning lines, the coordinate of the central scanning line is m/2, the central scanning line is denoted as AB, and the principal optical axis corresponding to the central scanning line is OC and thus there is a relationship $\overline{AB} \perp \overline{OC}$;

1) calculating a vector expression v1 of a line $\overline{Op_f}$ connecting the point $p_f$ on the tangent plane and a corresponding projection center O;

specifically, firstly calculating the expressions of the line segments $\overline{OC}$ and $\overline{Cp_f}$ respectively;

$$\overrightarrow{OC}=[0, f \sin \phi_c, f \cos \phi_c]$$

$$\overrightarrow{Cp_f}=f \tan \alpha_x[(x_f-p_x^f),(y_f-p_y^f)\cos \phi_c, -(y_f-p_y^f)\sin \phi_c]$$

in the above formulas, calculating $v1=\overrightarrow{OC}+\overrightarrow{Cp_f}$;

2) based on the above vector, calculating a rotational angle ω of the scanning line where the point $p_f$ is located with respect to the central scanning line and further calculating a scanning line coordinate $x_r$;

specifically, calculating $\overrightarrow{Op_f}=\overrightarrow{OC}+\overrightarrow{Cp_f}$, to obtain a rotation angle ω of the plane where the $\overrightarrow{Op_f}$ is located with respect to a visual plane of the central scanning line;

$$\omega = \arctan\left(\frac{x(\overrightarrow{Op_f})}{z(\overrightarrow{Op_f})}\right) = \arctan\left(\frac{(x_f-p_x^f)\tan\alpha_x}{\cos\phi_c-(y_f-p_y^f)\tan\alpha_x\sin\phi_c}\right)$$

and then, according to the included angle of adjacent scanning lines and the central scanning line coordinate, calculating a coordinate of an inverse projection point x on the rotational scanning image:

$$x_r=\omega/\alpha_x+p_x^r$$

3) calculating a vector expression v2 of the principal optical axis of the scanning line where the point $p_f$ is located;

the vector of the principal optical axis of the scanning line where the point $p_f$ is located, i.e. of the line segment $\overline{OC}$ rotating by an angle of ω around the rotation axis is expressed as:

$$v2=[f\cos\phi_c\sin\omega, f\sin\phi_c, f\cos\phi_c\cos\omega]$$

4) calculating the included angle of v1 and v2, i.e. the included angle γ of the image point and the principal optical axis, and further calculating the ordinate $y_r$ of the scanning line;

specifically, according to the above expressions of v1 and v2, in combination with vector dot product calculation formula, obtaining the included angle γ of the $p_f$ and the principal optical axis of the scanning line where the point $p_f$ is located:

$$\gamma = \arccos\left(\frac{v1 \cdot v2}{|v1||v2|}\right);$$

finally, according to the lens focal length and the coordinate of the image principal point, calculating the final coordinate of the inverse projection point y:

$$y_r=f\tan\gamma+p_y^r.$$

7. The method of claim 1, wherein, the step S103 is implemented as follows:

for a rotational linear array scanning image, firstly using an automatic detection and matching method of feature point or manual point selection method to determine a homonymy point correspondence between images and then projecting coordinates of homonymy points of all images to the corresponding equivalent frame image, and finally using an existing structure-from-motion method, incremental SFM or global SFM method, or automatic three-dimensional reconstruction software, taking the focal length and the coordinate of the image principal point of the equivalent frame image as known parameters, and in a case of a condition of not performing optimization, restoring the pose parameter of the equivalent frame image and the waypoint three-dimensional coordinate corresponding to the homonymy point, wherein the pose parameter comprises a three-dimensional coordinate and an imaging pose of an image projection center.

8. The method of claim 1, wherein, the step S104 is implemented as follows:

with any rectangular coordinate system as a world coordinate system, its coordinate value is $(X_w, Y_w, Z_w)$; with a rotational shaft of the rotational cradle head as y axis and the principal optical axis corresponding to the first scanning line as z axis, constructing a right-hand rectangular coordinate system as a sensor coordinate system, wherein its coordinate value is denoted as $(X_s, Y_s, Z_s)$; with the principal optical axis of a moment as z axis and the rotational shaft as y axis, constructing a right-hand rectangular coordinate system $X_t Y_t Z_t$ as a rotational cradle head coordinate system; with the principal point of the linear array camera as origin, the principal optical axis as z axis and y axis parallel to the scanning line, constructing a right-hand rectangular coordinate system $X_c Y_c Z_c$ as a camera coordinate system; with an upper left point of an imaging two-dimensional plane as origin and the scanning line as y axis, constructing a two-dimensional plane coordinate system uv as an image coordinate system, describing the transformation from the world coordinate system to the image coordinate system based on the following formula, i.e. a rigorous imaging model of the rotational scanning linear array camera:

$$\begin{bmatrix} f_x & 0 & p_x^r \\ 0 & f_y & p_y^r \\ 0 & 0 & 1 \end{bmatrix} R_{T\to C}\left(R_{S\to T}R_{W\to S}\begin{bmatrix} X_w-X_0 \\ Y_w-Y_0 \\ Z_w-Z_0 \end{bmatrix}+\begin{bmatrix} e_x \\ e_y \\ e_z \end{bmatrix}\right) = s\begin{bmatrix} 0 \\ v \\ 1 \end{bmatrix}$$

wherein $R_{T\to C}$ is a camera set matrix describing a camera set pose; $[e_x, e_y, e_z]^T$ is an offset vector of the camera coordinate system describing eccentricity of a camera setting; for convenience of descriptions, the origin of the rotational cradle head coordinate system is defined as projection of the origin of the camera coordinate system on the y axis of the rotational cradle head coordinate system, and thus $e_y=0$; $R_{S\to T}$ is a rotational cradle head rotation matrix describing a rotational angle of the rotational cradle head, which is generated by calculation using a single angle parameter; $R_{W\to S}$ and $[X_0, Y_0, Z_0]^T$ are a rotation matrix and a translation vector from the world coordinate system to the sensor coordinate system; s is a scale parameter; v is an ordinate of an image of the projection point; $f_y$ is a lens focal length value along the direction of y axis, $f_x$ is a lens focal length value along the direction of x axis, $(p_x^r, p_y^r)$ is a coordinate of an image principal point of the camera; for a rotational scanning linear array camera, the abscissa of the projection point is 0 constantly, and thus $p_x^r=0$, and the value $f_x$ does not affect the final position of the projection point, and therefore it is not a imaging model parameter;

$R_{T \to C}$ is obtained by multiplying the rotation matrix corresponding to a pitch angle $\phi_c$, a yaw angle $\omega_c$ and a roll angle $\kappa_c$ of the camera in the following formula:

$$R_{T \to C} = \begin{bmatrix} a_{11} & a_{12} & a_{13} \\ a_{21} & a_{22} & a_{23} \\ a_{31} & a_{32} & a_{33} \end{bmatrix}$$

$$= \begin{bmatrix} 1 & 0 & 0 \\ 0 & \cos\phi_c & -\sin\phi_c \\ 0 & \sin\phi_c & \cos\phi_c \end{bmatrix} \begin{bmatrix} \cos\omega_c & 0 & \sin\omega_c \\ 0 & 1 & 0 \\ -\sin\omega_c & 0 & \cos\omega_c \end{bmatrix} \begin{bmatrix} \cos\kappa_c & -\sin\kappa_c & 0 \\ \sin\kappa_c & \cos\kappa_c & 0 \\ 0 & 0 & 1 \end{bmatrix}$$

wherein $\alpha_{11}, \ldots, \alpha_{33}$ are parameters of the rotation matrices;

$R_{S \to T}$ is the rotational cradle head rotation matrix; since the rotational scanning imaging cradle head rotates around the y axis, the matrix is generated using a single angle parameter $\theta$ in the following calculation formula:

$$R_{S \to T} = \begin{bmatrix} \cos\theta & 0 & \sin\theta \\ 0 & 1 & 0 \\ -\sin\theta & 0 & \cos\theta \end{bmatrix}$$

$R_{W \to S}$ is a rotation matrix from the world coordinate system to the sensor coordinate system, which is also obtained by using three pose angles $(\phi_s, \omega_s, \kappa_s)$ in the following calculation formula:

$$R_{S \to T} = \begin{bmatrix} 1 & 0 & 0 \\ 0 & \cos\phi_s & -\sin\phi_s \\ 0 & \sin\phi_s & \cos\phi_s \end{bmatrix} \begin{bmatrix} \cos\omega_s & 0 & \sin\omega_s \\ 0 & 1 & 0 \\ -\sin\omega_s & 0 & \cos\omega_s \end{bmatrix} \begin{bmatrix} \cos\kappa_s & -\sin\kappa_s & 0 \\ \sin\kappa_s & \cos\kappa_s & 0 \\ 0 & 0 & 1 \end{bmatrix}$$

in a word, the rigorous imaging model of the rotational scanning linear array camera comprises a total of 14 parameters, i.e. the accurate imaging parameters of the rotational linear array scanning image, wherein, 2 camera intrinsic parameters: $f_y$ and $p_y^r$;

6 rotational cradle head parameters: $\theta$, $(\phi_c, \omega_c, \kappa_c)$, $e_x$, $e_z$;

6 extrinsic parameters of the imaging system: $(\phi_s, \omega_s, \kappa_s)$ and $[X_0, Y_0, Z_0]$;

through arrangement, the above rigorous imaging model is expressed as:

$$\begin{bmatrix} f_x & 0 & p_x^r \\ 0 & f_y & p_y^r \\ 0 & 0 & 1 \end{bmatrix} \begin{bmatrix} a_{11}\hat{X} + a_{12}\hat{Y} + a_{13}\hat{Z} \\ a_{21}\hat{X} + a_{22}\hat{Y} + a_{23}\hat{Z} \\ a_{31}\hat{X} + a_{32}\hat{Y} + a_{33}\hat{Z} \end{bmatrix} = s \begin{bmatrix} 0 \\ v \\ 1 \end{bmatrix}$$

the calculation formula of the $[\hat{X}, \hat{Y}, \hat{Z}]^T$ is as follows:

$$\begin{bmatrix} \hat{X} \\ \hat{Y} \\ \hat{Z} \end{bmatrix} = \begin{bmatrix} X_s \cos(\theta) - Z_s \sin(\theta) - e_x \\ Y_s \\ X_s \sin(\theta) - Z_s \cos(\theta) - e_z \end{bmatrix}$$

in this case, an analytical expression of the image coordinate of the projection point is solved:

$$\begin{cases} y = f_y \dfrac{a_{21}\hat{X} + a_{22}\hat{Y} + a_{23}\hat{Z}}{a_{31}\hat{X} + a_{32}\hat{Y} + a_{33}\hat{Z}} + p_y^r \\ x = \dfrac{1}{\alpha_x} \arcsin\left( \dfrac{-bc \pm |a|\sqrt{a^2 + b^2 - c^2}}{a^2 + b^2} \right) + p_x^r \end{cases}$$

wherein, $$\begin{cases} a = a_{11}X_s + a_{13}Z_s \\ b = a_{13}X_s - a_{11}Z_s \\ c = a_{12}Y_s - a_{11}e_x - a_{13}e_Z \end{cases}$$

* * * * *